United States Patent
Schaetzle (10) Patent No.: US 7,558,821 B2
(45) Date of Patent: Jul. 7, 2009

(54) PROCESS FOR ASSIGNING ADDRESSES IN A NETWORK, AND COMPONENTS FOR SAID PROCESS

(75) Inventor: Rolf Schaetzle, Fischerbach (DE)

(73) Assignee: Vega Grieshaber KG, Wolfach (DE)

( * ) Notice: Subject to any disclaimer, the term of this patent is extended or adjusted under 35 U.S.C. 154(b) by 344 days.

(21) Appl. No.: 10/245,700

(22) Filed: Sep. 18, 2002

(65) Prior Publication Data

US 2003/0140125 A1    Jul. 24, 2003

(30) Foreign Application Priority Data

Jan. 24, 2002   (DE)  .............................. 102 02 851

(51) Int. Cl.
*G06F 12/02*    (2006.01)

(52) U.S. Cl. .................. 709/203; 709/245; 709/223; 709/225; 709/226; 709/246; 710/2; 710/4; 710/9; 710/17; 710/18; 710/104

(58) Field of Classification Search .............. 709/203, 709/245, 223, 225, 226, 246; 710/2, 4, 9, 710/17, 18, 104

See application file for complete search history.

(56) References Cited

U.S. PATENT DOCUMENTS

| | | | | |
|---|---|---|---|---|
| 4,360,870 A | * | 11/1982 | McVey | ............................ 710/9 |
| 4,730,251 A | * | 3/1988 | Aakre et al. | ................. 710/104 |
| 5,502,438 A | | 3/1996 | Blevin et al. | |
| 5,636,342 A | | 6/1997 | Jeffries | |
| 2003/0074505 A1 | * | 4/2003 | Andreas et al. | .............. 710/110 |

FOREIGN PATENT DOCUMENTS

| | | |
|---|---|---|
| DE | 196 21 272 A1 | 11/1997 |
| DE | 197 33 906 A1 | 2/1999 |
| WO | 99/08164 | 2/1999 |

* cited by examiner

*Primary Examiner*—Ario Etienne
*Assistant Examiner*—Barbara N Burgess
(74) *Attorney, Agent, or Firm*—The Nath Law Group; Stanley N. Protigal; Sungyeop Chung (57) ABSTRACT

A process is proposed for the automatic assignment of at least one client device address in a DP network, where the DP network comprises a server device and at least one client device and where the client devices exhibit a unique property, which for each client device has a different value taken from a finite group of values. The process has the following steps: a) set the finite values-group as the search values-group (1); b) divide the search values-group into at least two subgroups (4) and assign addresses to the client devices (5), so that after the addresses are assigned all client devices for which the value of the unique property lies in the first subgroup have an initial address (b) and all client devices for which the value of the unique property lies in the second subgroup have a second address (a); c) divide the search values-group (6) and examine (7) whether there exists at least one client device that is addressed with the first address (b); d) if so, and if the first subgroup contains more than one element (8), set the $1^{st}$ subgroup as the search values-group (9), divide the search values-group (10) and assign address (a) to the $2^{nd}$ subgroup (11); return to step c); e) if not, and if the $2^{nd}$ subgroup contains more than one element (12), set the $2^{nd}$ subgroup as the search values-group (13), divide the search values-group (14) and assign address (a) to the $2^{nd}$ subgroup (15); return to step c).

18 Claims, 7 Drawing Sheets

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1 Set ->a (0-15) | a | a | a | a | a | a | a | a | a | a | a | a | a | a | a | a |
| 2 Set a->b (0-7) | b | b | b | b | b | b | b | b | a | a | a | a | a | a | a | a |
| 3 Check b | | | + | + | | | | | | | | | | | | |
| 4 Set b->a (4-7) | b | b | b | b | a | a | a | a | a | a | a | a | a | a | a | a |
| 5 Check b | | | + | + | | | | | | | | | | | | |
| 6 Set b->a (2-3) | b | b | a | a | a | a | a | a | a | a | a | a | a | a | a | a |
| 7 Check b | | | - | - | | | | | | | | | | | | |
| 8 Set a->b (2-2) | b | b | b | a | a | a | a | a | a | a | a | a | a | a | a | a |
| 9 Check b | | | + | - | | | | | | | | | | | | |
| 10 Set b->1 (2-2) | b | b | 1 | a | a | a | a | a | a | a | a | a | a | a | a | a |
| 11 Set b->a (0-15) | a | a | 1 | a | a | a | a | a | a | a | a | a | a | a | a | a |
| 12 Set a->b (0-7) | b | b | 1 | b | b | b | b | b | a | a | a | a | a | a | a | a |
| 13 Check b | | | - | + | | | | | | | | | | | | |
| 14 Set b->a (4-7) | b | b | 1 | b | a | a | a | a | a | a | a | a | a | a | a | a |
| 15 Check b | | | - | + | | | | | | | | | | | | |
| 16 Set b->a (2-3) | b | b | 1 | a | a | a | a | a | a | a | a | a | a | a | a | a |
| 17 Check b | | | | | | | | | | | | | | | | |
| 18 Set a->b (2-2) | b | b | 1 | a | a | a | a | a | a | a | a | a | a | a | a | a |
| 19 Set a->2 (3-3) | b | b | 1 | 2 | a | a | a | a | a | a | a | a | a | a | a | a |
| 20 Set b->a (0-15) | a | a | 1 | 2 | a | a | a | a | a | a | a | a | a | a | a | a |
| 21 Set a->b (0-7) | b | b | 1 | 2 | b | b | b | b | a | a | a | a | a | a | a | a |
| 22 Check b | | | | | | | | | | | | | | | | |
| 23 Set a->b (8-11) | b | b | 1 | 2 | b | b | b | b | b | b | b | b | a | a | a | a |
| 24 Check b | | | - | | | | | | | + | | | | | | |
| 25 Set b->a (10-11) | b | b | 1 | 2 | b | b | b | b | b | b | a | a | a | a | a | a |
| 26 Check b | | | | | | | | | | + | | | | | | |
| 27 Set b->a (9-9) | b | b | 1 | 2 | b | b | b | b | b | a | a | a | a | a | a | a |
| 28 Check b | | | - | - | | | | | | - | | | | | | |
| 29 Set a->3 (9-9) | b | b | 1 | 2 | b | b | b | b | b | 3 | a | a | a | a | a | a |

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1 Set ->a (0-15) | a | a | a | a | a | a | a | a | a | a | a | a | a | a | a | a |
| 2 Set a->b (0-7) | b | b | b | b | b | b | b | b | a | a | a | a | a | a | a | a |
| 3 Check b | | | + | + | | | | | | | | | | | | |
| 4 Set b->a (4-7) | b | b | b | b | a | a | a | a | a | a | a | a | a | a | a | a |
| 5 Check b | | | + | + | | | | | | | | | | | | |
| 6 Set b->a (2-3) | b | b | a | a | a | a | a | a | a | a | a | a | a | a | a | a |
| 7 Check b | | | - | - | | | | | | | | | | | | |
| 8 Set a->b (2-2) | ✕ | ✕ | b | a | a | a | a | a | a | a | a | a | a | a | a | a |
| 9 Check b | ✕ | ✕ | + | - | | | | | | | | | | | | |
| 10 Set b->1 (2-2) | ✕ | ✕ | 1 | a | a | a | a | a | a | a | a | a | a | a | a | a |
| 11 Set b->a (3-15) | ✕ | ✕ | ✕ | a | a | a | a | a | a | a | a | a | a | a | a | a |
| 12 Set a->b (3-9) | ✕ | ✕ | ✕ | b | b | b | b | b | b | b | a | a | a | a | a | a |
| 13 Check b | ✕ | ✕ | ✕ | + | | | | | | + | | | | | | |
| 14 Set b->a (7-9) | ✕ | ✕ | ✕ | b | b | b | b | a | a | a | a | a | a | a | a | a |
| 15 Check b | ✕ | ✕ | ✕ | + | | | | | | | | | | | | |
| 16 Set b->a (5-6) | ✕ | ✕ | ✕ | b | b | a | a | a | a | a | a | a | a | a | a | a |
| 17 Check b | ✕ | ✕ | ✕ | + | | | | | | - | | | | | | |
| 18 Set b->a (4-4) | ✕ | ✕ | ✕ | b | a | a | a | a | a | a | a | a | a | a | a | a |
| 19 Check b | ✕ | ✕ | ✕ | + | | | | | | | | | | | | |
| 20 Set b->2 (3-3) | ✕ | ✕ | ✕ | 2 | a | a | a | a | a | a | a | a | a | a | a | a |
| 21 Set a->b (4-9) | ✕ | ✕ | ✕ | ✕ | b | b | b | b | b | b | a | a | a | a | a | a |
| 22 Check b | ✕ | ✕ | ✕ | ✕ | | | | | | + | | | | | | |
| 23 Set b->a (7-9) | ✕ | ✕ | ✕ | ✕ | b | b | b | a | a | a | a | a | a | a | a | a |
| 24 Check b | ✕ | ✕ | ✕ | ✕ | | | | | | - | | | | | | |
| 25 Set a->b (7-8) | ✕ | ✕ | ✕ | ✕ | ✕ | ✕ | ✕ | b | b | a | a | a | a | a | a | a |
| 26 Check b | ✕ | ✕ | ✕ | ✕ | ✕ | ✕ | ✕ | | | - | | | | | | |
| 27 Set a->3 (9-9) | ✕ | ✕ | ✕ | ✕ | ✕ | ✕ | ✕ | ✕ | ✕ | 3 | a | a | a | a | a | a |

Fig. 5

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1 Set ->1 (0-15) | 1 | 1 | 1 | 1 | 1 | 1 | 1 | 1 | 1 | 1 | 1 | 1 | 1 | 1 | 1 | 1 |
| 2 Set 1->2 (0-7) | 2 | 2 | 2 | 2 | 2 | 2 | 2 | 2 | 1 | 1 | 1 | 1 | 1 | 1 | 1 | 2 |
| 3 Check 2 | | | + | + | | | | | | | | | | | | |
| 4 Set 2->1 (4-7) | 2 | 2 | 2 | 2 | 1 | 1 | 1 | 1 | 1 | 1 | 1 | 1 | 1 | 1 | 1 | 2 |
| 5 Check 2 | | | + | + | | | | | | | | | | | | |
| 6 Set 2->1 (2-3) | 2 | 2 | 1 | 1 | 1 | 1 | 1 | 1 | 1 | 1 | 1 | 1 | 1 | 1 | 1 | 1 |
| 7 Check 2 | | | - | - | | | | | | | | | | | | |
| 8 Set 1->2 (2-2) | × | × | 2 | 1 | 1 | 1 | 1 | 1 | 1 | 1 | 1 | 1 | 1 | 1 | 1 | 1 |
| 9 Check 2 | | | + | | | | | | | | | | | | | |
| 10 Set 2->1 (3-15) | × | × | | 1 | 1 | 1 | 1 | 1 | 1 | 1 | 1 | 1 | 1 | 1 | 1 | 1 |
| 11 Set 1->3 (3-9) | × | × | | 3 | 3 | 3 | 3 | 3 | 3 | 1 | 1 | 1 | 1 | 1 | 1 | |
| 12 Check 3 | × | × | | + | | | | | | + | | | | | | |
| 13 Set 3->1 (7-9) | × | × | | 3 | 3 | 3 | 3 | 1 | 1 | 1 | 1 | 1 | 1 | 1 | 1 | 1 |
| 14 Check 3 | × | × | | + | | | | | | - | | | | | | |
| 15 Set 3->1 (5-6) | × | × | | 3 | 3 | 1 | 1 | 1 | 1 | 1 | 1 | 1 | 1 | 1 | 1 | 1 |
| 16 Check 3 | × | × | | + | | | | | | - | | | | | | |
| 17 Set 3->1 (4-4) | × | × | | 3 | 1 | 1 | 1 | 1 | 1 | 1 | 1 | 1 | 1 | 1 | 1 | 1 |
| 18 Check 3 | × | × | | + | | | | | | | | | | | | |
| 19 Set 1->4 (4-9) | × | × | × | × | 4 | 4 | 4 | 4 | 4 | 4 | 1 | 1 | 1 | 1 | 1 | 1 |
| 20 Check 4 | × | × | × | × | | | | | | + | | | | | | |
| 21 Set b->1 (7-9) | × | × | × | × | 4 | 4 | 4 | 1 | 1 | 1 | 1 | 1 | 1 | 1 | 1 | 1 |
| 22 Check 4 | × | × | × | × | | | | | | - | | | | | | |
| 23 Set 1->4 (7-8) | × | × | × | × | × | × | × | 4 | 4 | 1 | 1 | 1 | 1 | 1 | 1 | 1 |
| 24 Check 4 | × | × | × | × | × | × | × | | | - | | | | | | |
| 26 Set 1->5(10-15) | | | | | | | | | | | 5 | 5 | 5 | 5 | 5 | 5 |
| 27 Check 5 | | | | | | | | | | | | | | | | + |

|  | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1 Set ->1 (0-15) | 1 | 1 | 1 | 1 | 1 | 1 | 1 | 1 | 1 | 1 | 1 | 1 | 1 | 1 | 1 | 1 |
| 2 Set 1->2 (0-7) | 2 | 2 | 2 | 2 | 2 | 2 | 2 | 2 | 1 | 1 | 1 | 1 | 1 | 1 | 1 | 1 |
| 3 Check 2 |  |  | + | + |  |  |  |  |  |  |  |  |  |  |  |  |
| 4 Set 2->3 (0-3) | 3 | 3 | 3 | 3 | 2 | 2 | 2 | 2 | 1 | 1 | 1 | 1 | 1 | 1 | 1 | 1 |
| 5 Check 3 |  |  | + | + |  |  |  |  |  |  |  |  |  |  |  |  |
| 6 Set 3->4 (0-1) | 4 | 4 | 3 | 3 | 2 | 2 | 2 | 2 | 1 | 1 | 1 | 1 | 1 | 1 | 1 | 1 |
| 7 Check 4 |  |  |  |  |  |  |  |  |  |  |  |  |  |  |  |  |
| 8 Set 3->4 (2-2) |  |  | 4 | 3 | 2 | 2 | 2 | 2 | 1 | 1 | 1 | 1 | 1 | 1 | 1 | 1 |
| 9 Check 4 |  |  | + |  |  |  |  |  |  |  |  |  |  |  |  |  |
| 10 Check 4 |  |  |  | + |  |  |  |  |  |  |  |  |  |  |  |  |
| 11 Set ->1 (4-15) |  |  |  |  | 1 | 1 | 1 | 1 | 1 | 1 | 1 | 1 | 1 | 1 | 1 | 1 |
| 12 Check 1 |  |  |  |  |  |  |  |  |  | + |  |  |  |  |  | + |
| 13 Set 1->3 (4-9) |  |  |  |  | 3 | 3 | 3 | 3 | 3 | 3 | 1 | 1 | 1 | 1 | 1 | 1 |
| 14 Check 3 |  |  |  |  |  |  |  |  |  | + |  |  |  |  |  |  |
| 15 Set 3->5 (4-6) |  |  |  |  | 5 | 5 | 5 | 3 | 3 | 3 | 1 | 1 | 1 | 1 | 1 | 1 |
| 16 Check 5 |  |  |  |  |  |  |  |  |  | - |  |  |  |  |  |  |
| 17 Set 3->5 (7-8) |  |  |  |  |  |  |  | 5 | 5 | 3 | 1 | 1 | 1 | 1 | 1 | 1 |
| 18 Check 5 |  |  |  | + |  |  |  |  |  |  |  |  |  |  |  |  |
| 19 Set ->1 (10-15) |  |  |  |  |  |  |  |  |  |  | 1 | 1 | 1 | 1 | 1 | 1 |
| 20 Check 1 |  |  |  |  |  |  |  |  |  | + |  |  |  |  |  |  |
| 21 Set 1->5 (10-12) |  |  |  |  |  |  |  |  |  |  | 5 | 5 | 5 | 1 | 1 | 1 |
| 22 Check 5 |  |  |  |  |  |  |  |  |  |  |  |  |  |  |  |  |
| 23 Set 1->5 (13-14) |  |  |  |  |  |  |  |  |  |  |  |  |  | 5 | 5 | 1 |

PROCESS FOR ASSIGNING ADDRESSES IN A NETWORK, AND COMPONENTS FOR SAID PROCESS

CROSS-REFERENCE TO RELATED APPLICATIONS

This application claims a benefit of German patent application No. 102 02 851.6, filed Jan. 24, 2002.

BACKGROUND OF THE INVENTION

1. Field of the Invention

The present invention relates to a process for the automatic assignment of at least one client address in a data processing network comprising a server device and at least one client device.

2. Description of Related Art Including Information Disclosed Under 37 C.F.R. 1.97 AND 37 C.F.R. §1.98

Device addresses must be clearly assigned in a network so that communication with specific devices is possible. The manual assignment of these addresses, e.g., as performed by the adjustment of control elements on the individual devices, is laborious and subject to error, since a single incorrectly set control element is enough to throw the network out of operation, and it is frequently impossible to immediately identify the error. Moreover, it is difficult to access the control elements of all devices belonging to a network, some of which may be far removed from each other, and to adjust those control elements.

BRIEF SUMMARY OF THE INVENTION

The goal of the invention is to specify components for a DP network, as well as a process for automatically assigning addresses in a DP network, such that the above-described deficiencies in address assignment are eliminated, i.e., a rapid and error-free address assignment is guaranteed.

The process according to the invention is executed by a server device belonging to a DP network and requires a client device whose address in the DP network can be set by an address-setting command that is sent by the DP network to the client device; the client device is set up in such a way as to compare the value of a unique property possessed by itself with the value range for this property as given in the address-setting command, and to execute the command or not to execute it, depending on the outcome of the comparison.

For the process according to the invention the above-mentioned property of the client device must exhibit a different value, deriving from a finite group of values, for each client device of the DP network to which the process is applied. The process has the following steps:

a) set the finite values-group as a search values-group;

b) divide the search values-group into at least two subgroups and assign addresses to the client devices, so that after the addresses are assigned all client devices for which the value of the unique property lies in the first subgroup have an initial address and all client devices for which the value of the unique property lies in the second subgroup have a second address;

c) check whether there exists at least one client device that can be addressed with the first address;

d) if this is the case and if the first subgroup contains more than one element, return to step b), while setting the first subgroup as the search values-group and assigning address b to the $2^{nd}$ subgroup. However, if the first subgroup contains only one element, this means that a client device has been found for which the value of the unique property is that of an element of the first subgroup and that the first address has been assigned to this client device;

e) if the check performed in step c) shows that there is no client device that can be addressed with the first address and if the second subgroup contains more than one element, return to step b), setting the second subgroup as the search values-group and assigning address a) to the $1^{st}$ subgroup. If the second subgroup contains precisely one element, this means (if the original search values-group contains clients devices at all) that one element of the second subgroup is the value for the unique property of one of the client devices and that the second address has been assigned to this client device.

Because of the recursive return to step b) the subgroups grow ever smaller in the course of the process, until finally subgroups that contain only one element are obtained and the process can terminate.

In a preferred embodiment of the process the first and second addresses that are assigned to the subgroups in step b) are temporary addresses, and when the first subgroup in step d) or the second subgroup in step e) contains precisely one element, the client device whose unique property corresponds to this element is assigned a final address.

In a particularly simple form of the process, identical values are employed for the first and second address with each repetition of step b).

An alternative possibility is that for each repetition of step b) at least one value which thus far has not been assigned to an element of the search values-group is introduced for the first and/or the second address. To be sure, this procedure increases the number of the addresses distributed to the elements of the search values-group, but it also allows the process to be accelerated.

In this alternative design, if in step c) the first subgroup contains one element, a further examination will ideally determine whether a client exists that can be addressed with the second address. If this is the case and if the second subgroup contains only one element, this means that a client device has been found for which the value of the unique property corresponds to the element of the second subgroup and to which client device the second address has been assigned; if the second subgroup contains more than one element the second subgroup is set as the search values-group and the process returns to step b).

If a plurality of client addresses must be assigned, it is expedient—when the check performed in step c) indicates that no client can be addressed with the first address—to delete the elements of the first subgroup from the finite group of values. The consequence of this measure is that if step a) is repeated so as to assign another address, the search values-group is diminished, with the result that the assignment of an address may require a smaller number of subdivisions in the search values-group.

In the same fashion, each element of the finite values-group for which a client device has been found can be deleted from the finite values-group.

BRIEF DESCRIPTION OF THE SEVERAL VIEWS OF THE DRAWINGS

Further features and advantages of the invention will become evident in the following description of exemplary embodiments. Reference is made to the attached figures, which show.

DETAILED DESCRIPTION OF THE INVENTION

The process described below can be performed in any data processing system with a server device and one or more client devices, where the server device is able to transmit an address-assigning order to the client device, which order contains at least one parametric value in addition to the address being assigned; and where the client device(s) are able to decide whether they will or will not execute the address-assigning order, depending on a comparison made between said parametric value and a property possessed by the client device. The property can be any property with a finite number of values, and it must assured that no two client devices in the DP network have the same property value. The property can be, e.g., the serial number of the client device or of its network interfaces.

The DP network can have any conventional structure, and its description here is unnecessary.

To initialize the process it is necessary for the server device to know the possible values that can be possessed by the given property of the client device. This knowledge can result, e.g., from a convention specific to the manufacturer of the client device, such that only discrete values within a given range are used for the property; or a member of the operating personnel can input the limits of this range or can input a tabulation of the possible property values into the server device.

In an extreme case it is not even necessary for the operator to know with certainty the necessary values of the property; they can limit themselves to guessing a value range and to checking after the process has been implemented to determine whether all client devices have been assigned an address, and if this is not the case to repeating the process for another guessed range.

This tabulation or this interval of possible values for the property is designated in the following as the "finite values-group". In the following examples the finite values-group is the group of whole numbers between 0 and 15, and it is assumed that client devices are present whose unique property exhibits the value 2, 3, 9, or 15. Other value groups or values might be used instead.

Figure 1:
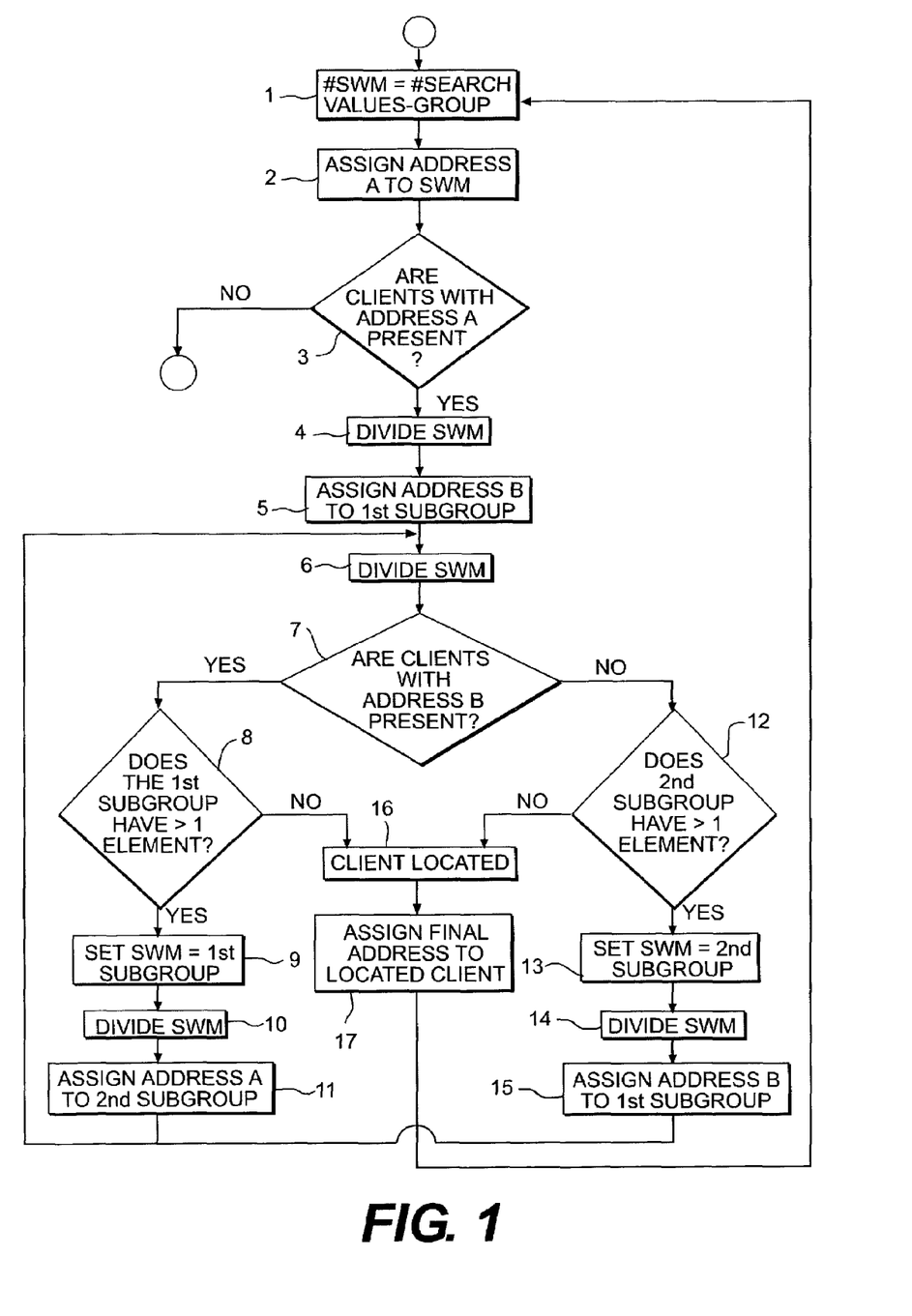
FIG. 1 a flow diagram of an initial embodiment of the process according to the invention FIG. 2 the sequence of commands that the server device sends to the client devices to implement the process shown in FIG. 1, including the effects of these commands FIG. 3 a modification of the flow diagram shown in FIG. 1

In step 1 of the process depicted in FIG. 1 this finite values-group is established as the search values-group, for which client devices are then sought whose property corresponds to one of the values of the search values-group.

Figure 2:
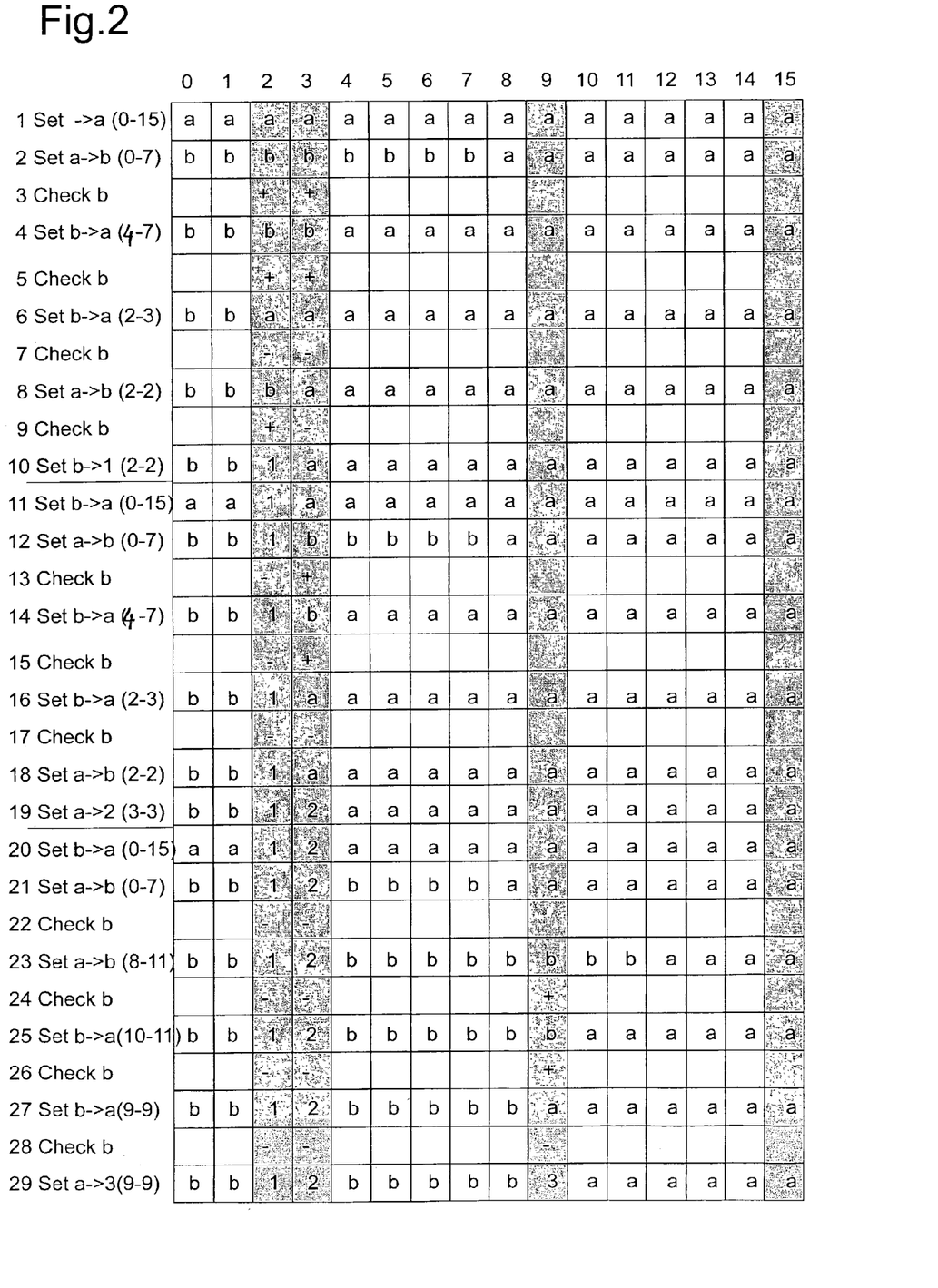

In step 2 the server device issues an address-assigning command, in line 1 of FIG. 2 as "set→a (0-15)"; with this command all network client devices for which the value of the property lies between 0 and 15, inclusive, are assigned the address a.

If the process is to be applied only to individual client devices in a DP network in which other client devices have already been assigned addresses, it is possible as an alternative to employ the command "set d→a (0-15)", where d is a default address which is the standard setting for the client devices that are to be assigned addresses and which is different from the addresses given to the other client devices. If the DP network is a profibus network, this default address d will generally have the value 126. The address a can have the value of 125, or any other value that has not already been assigned in the DP network.

If the addresses set on the client devices are not known, the addresses of all client devices of the DP network can be uniformly set at a by repeating the order "set d→a (0-15)", in order to then reassign them according to the procedure described below.

In step 3 it is the user's option to check whether client devices with address a are present. If this is not the case, the process will break off; if such client devices are present, step 4 subdivides the search values-group, ideally into two parts of equal size. In the example considered in FIG. 2 the division involves an initial subgroup with the elements $\{0, 1, \ldots, 7\}$ and a second subgroup with the elements $\{8, 9, \ldots, 15\}$. In step 5 the first subgroup is given a new address b, e.g., with the value 124. The second line of FIG. 2 shows the address distribution resulting from a command like "set a→b (0-7)". In step 6 the search values-group is subdivided.

In step 7 the server device sends an inspection command "check b" which is answered with a return message from all client devices with address b. Since the client devices with property values 2 and 3 have address b, the process branches off to step 8, which checks whether the first subgroup contains more than one element. This is the case in the present instance; the process consequently passes on to step 9, in which the first subgroup with values 0 to 7 is defined as a search values-group. In step 11 the $2^{nd}$ subgroup is assigned an address. The process then returns to step 6, where a new division of this search values-group is made, this time into subgroups $\{0, 1, 2, 3,\}$ and $\{4, 5, 6, 7\}$. The repetition of steps 6 and 7 (corresponding to line 5 in FIG. 2) shows that at least one client device with address b is present; since the search values-group still contains more than one element, steps 9 to 11 are repeated (corresponding to lines 6, 7 in FIG. 2). In this case, the inspection performed in step 7 (line 7) shows that no client device with address b is still present in the resulting $1^{st}$ subgroup $\{0, 1 \}$. The process consequently branches off to step 12, where an inspection is made as to whether the second subgroup, here group $\{2, 3\}$, contains more than one element. Since that is the case here, in step 13 the second subgroup $\{2, 3\}$ is defined as the search values-group, which results in subgroups $\{2\}$ and $\{3\}$. The now first subgroup $\{2\}$ is assigned address b in step 15 (line 8). In this case a client device with address b is again found in step 7 (line 9 in FIG. 2); but since the first subgroup includes only one element, namely $\{2\}$, step 8 branches off to step 16, where the server device recognizes that a client device with property value 2 is present and assigns it address 1 with the command "set→1 (2-2)" (step 17, line 10 in FIG. 2).

If more than one client device address is to be assigned, the process returns at this point to step 2, in which all unidentified client devices are again assigned address a with the command "set b→a (0-15)" (line 11 in FIG. 2). It should be noted that the client device with the property value 2 is not affected by this command; since the client device no longer has address b, it is not addressed by this command.

By repeating the process in a manner analogous to that described above the client devices with the property values 3, 9, 15 are found in turn and receive addresses 2, 3, . . . . These repetitions are not described here in detail; the commands transmitted by the server device are depicted in FIG. 2 for the case of a client device with property values 3 and 9.

Figure 3:
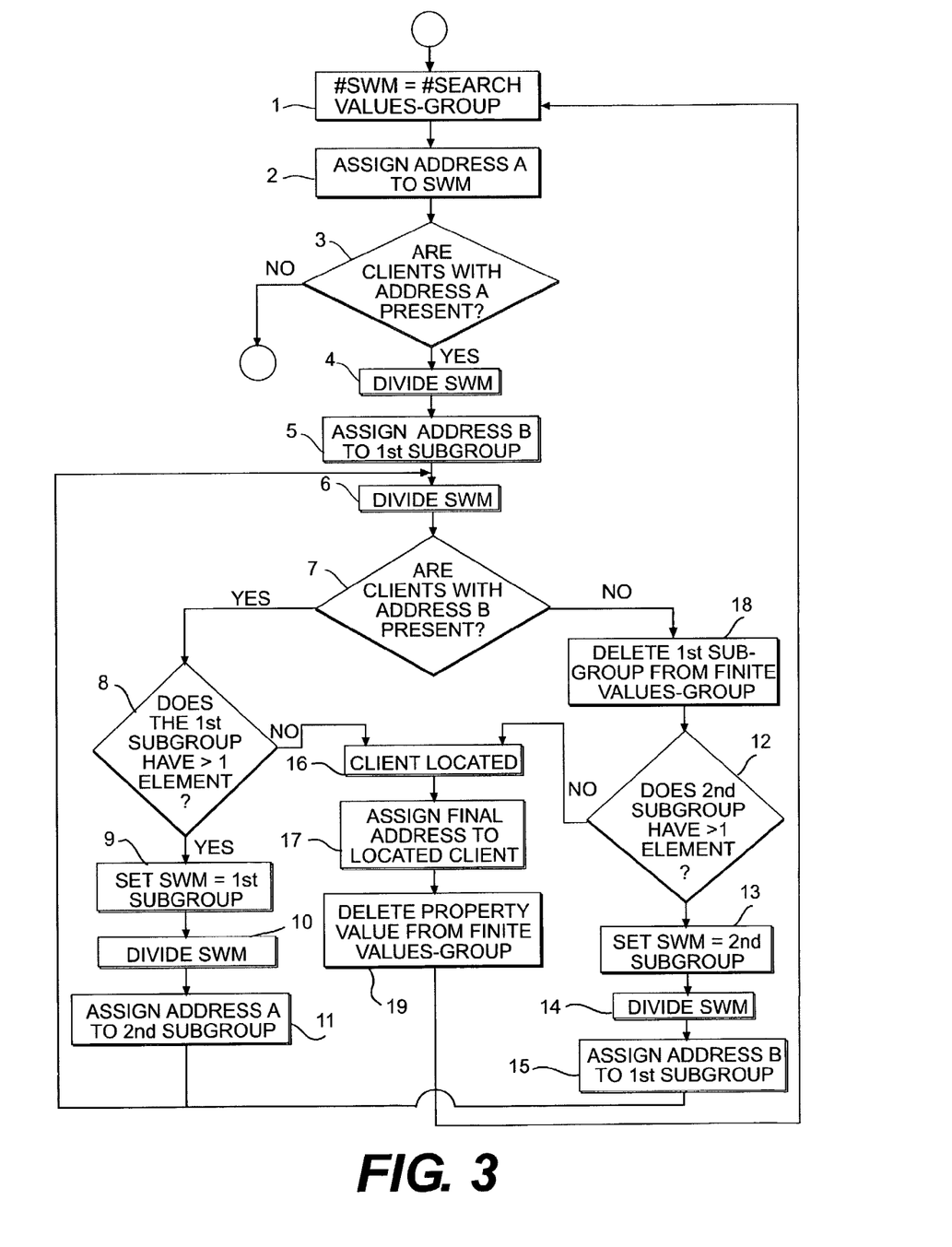

FIG. 3 gives a flow diagram for a modification of the process according to FIG. 1; it differs from the first version in that step 18, in which the elements of the first subgroup are deleted from the finite values-group, is inserted between steps 7 and 12; and through the addition of step 19, in which the property value of a client device found in the preceding step 16 is deleted from the finite values-group.

Figure 4:
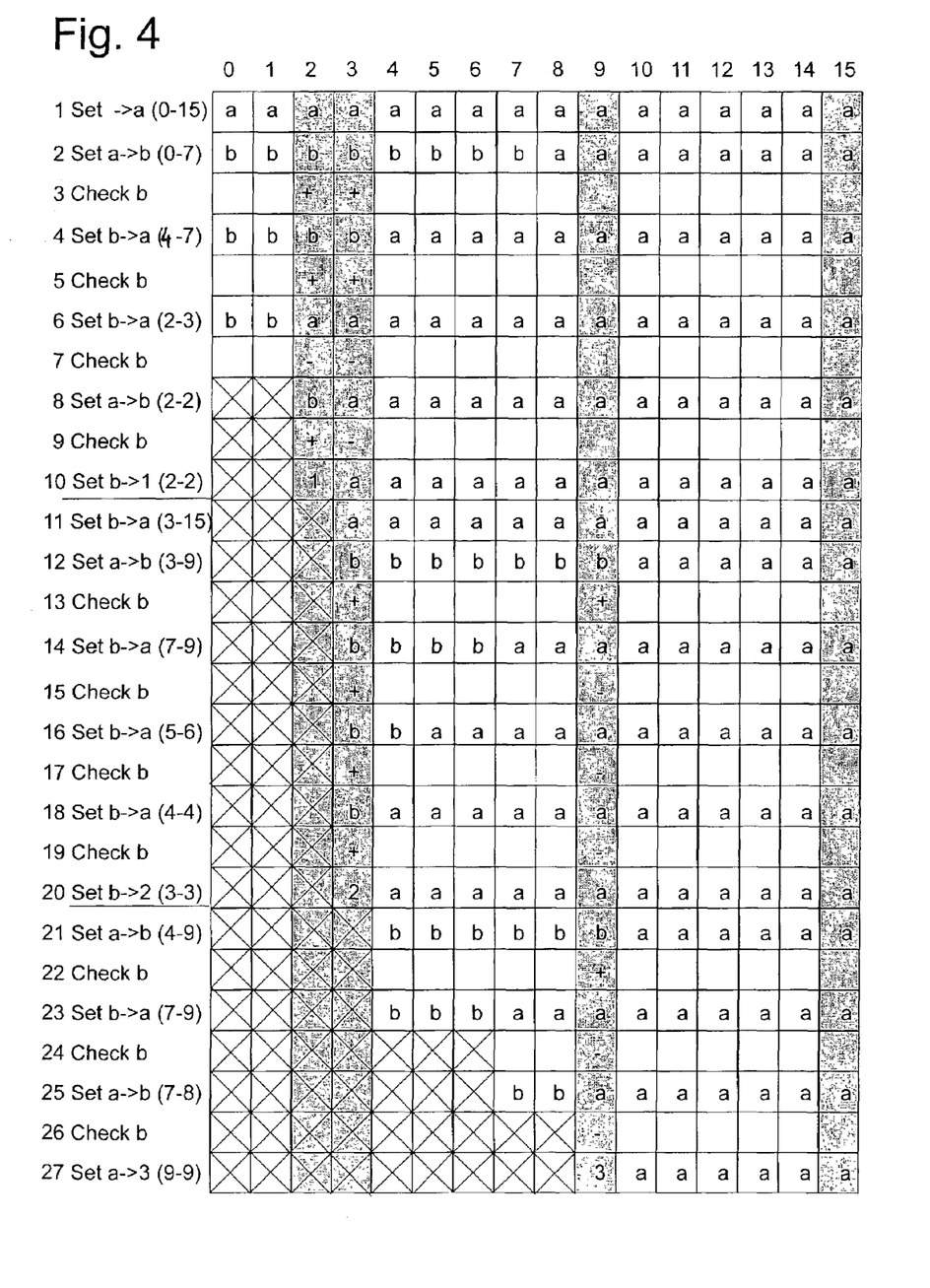
FIG. 4 analogous to FIG. 2, the sequence of the commands sent according to the flow diagram in FIG. 3, and their effects FIG. 5 a sequence of commands according to a modification of the process shown in FIGS. 3 and 4

FIG. 4 shows commands transmitted by the server device according to this process and the resulting assignment of addresses to the individual client devices. Up to line 7, FIG. 4 does not differ from FIG. 2. With the inspection in line 7 (step 7) the server device identifies that no client devices can correspond to the property values 0 and 1, and in step 18 it consequently deletes these property values from the finite values-group. In the figure this is indicated by the criss-crossed boxes in the columns for property values 0 and 1. This deletion has no effect at all in locating the client device with the property value 2.

After address 1 is assigned to the client device with property value 2 (line 10 in FIG. 4), said property value 2 is also deleted from the finite values-group in step 19, so that in line 11 of FIG. 4 the finite values-group only contains elements 3 to 15.

To locate the client device with property value 3, four steps 6 are necessary for subdividing the search values-group, as in the case for the process according to FIGS. 1 and 2. The resulting subgroups are no longer equally large in each subdivision; in the version considered here the first subgroup is selected to be larger by 1 than the second subgroup.

By finding the client device with the property value 3 the finite values-group is reduced to $\{4, 5, \ldots, 15\}$, and the number of subdivisions in the search values-group required for finding the client device with the property value 9 is reduced to 3. Two subdivisions would suffice for the search for the client device with the property value 15 (not shown in FIG. 4).

Figure 5:
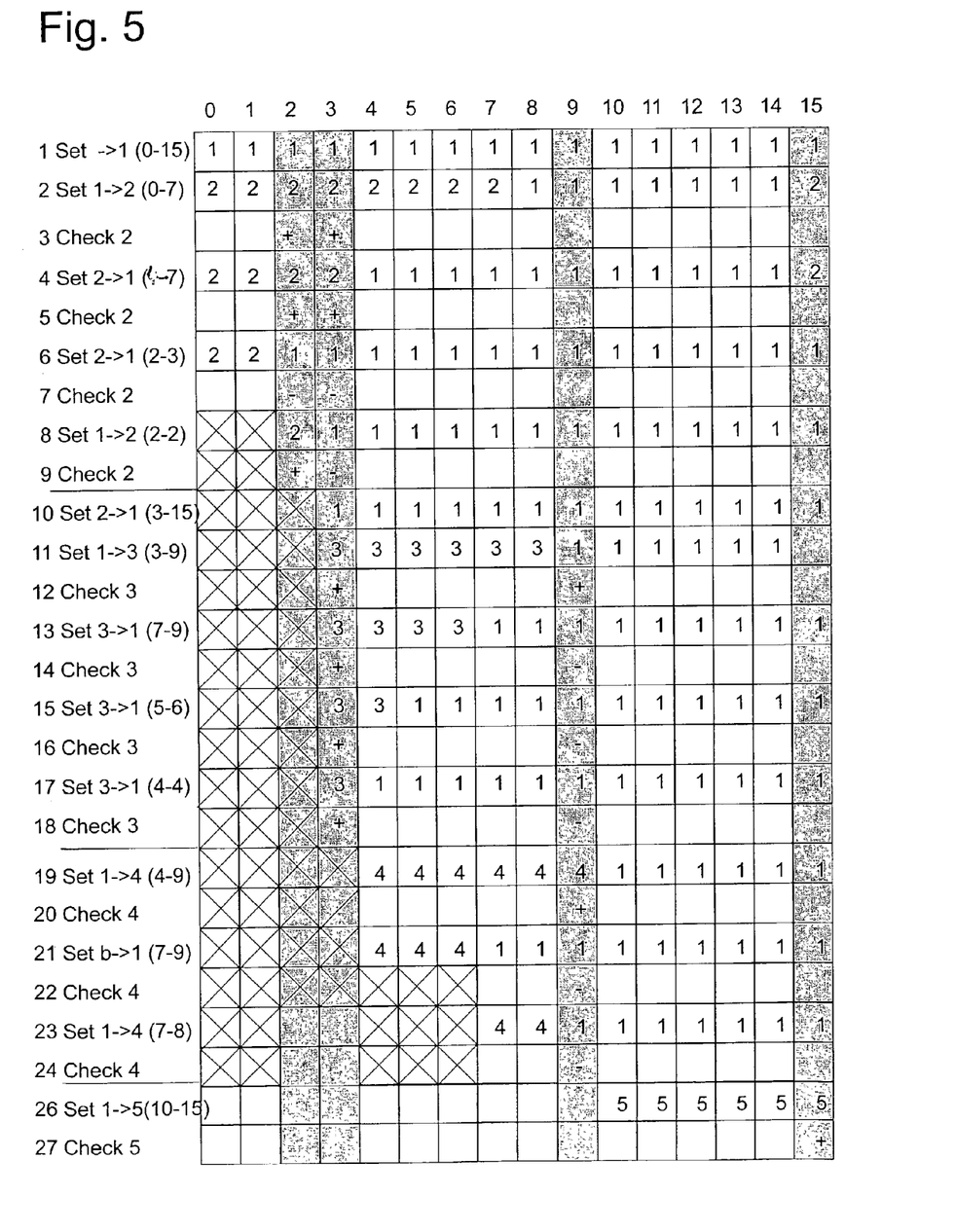

The command sequence shown in FIG. 5 differs from that of FIG. 4 in the values for the assigned addresses. Instead of temporary addresses a, b, final addresses 1, 2 are used from the outset. The final device with the property value 2 thus receives address 2, and step 17 for assigning the final addresses is omitted. Address 2 is then designated by the server device as no longer available, and in the search for the property value of the next client device all client devices with the property values in the reduced search values-group $\{3, 4, \ldots, 15\}$ are assigned the address 1, in step 2 (line 10 of FIG. 5). After dividing the search values-group (step 4), however, the still unassigned address 3 is introduced as the new address of the first subgroup in step 5 (line 11). The client device with the property value 3 in this manner obtains the address 3. As also emerges from FIG. 5, the client device with the property value 9 receives the address 1; and the search for the client device with the property value 15 takes place using addresses 4 and 5.

Figure 6:
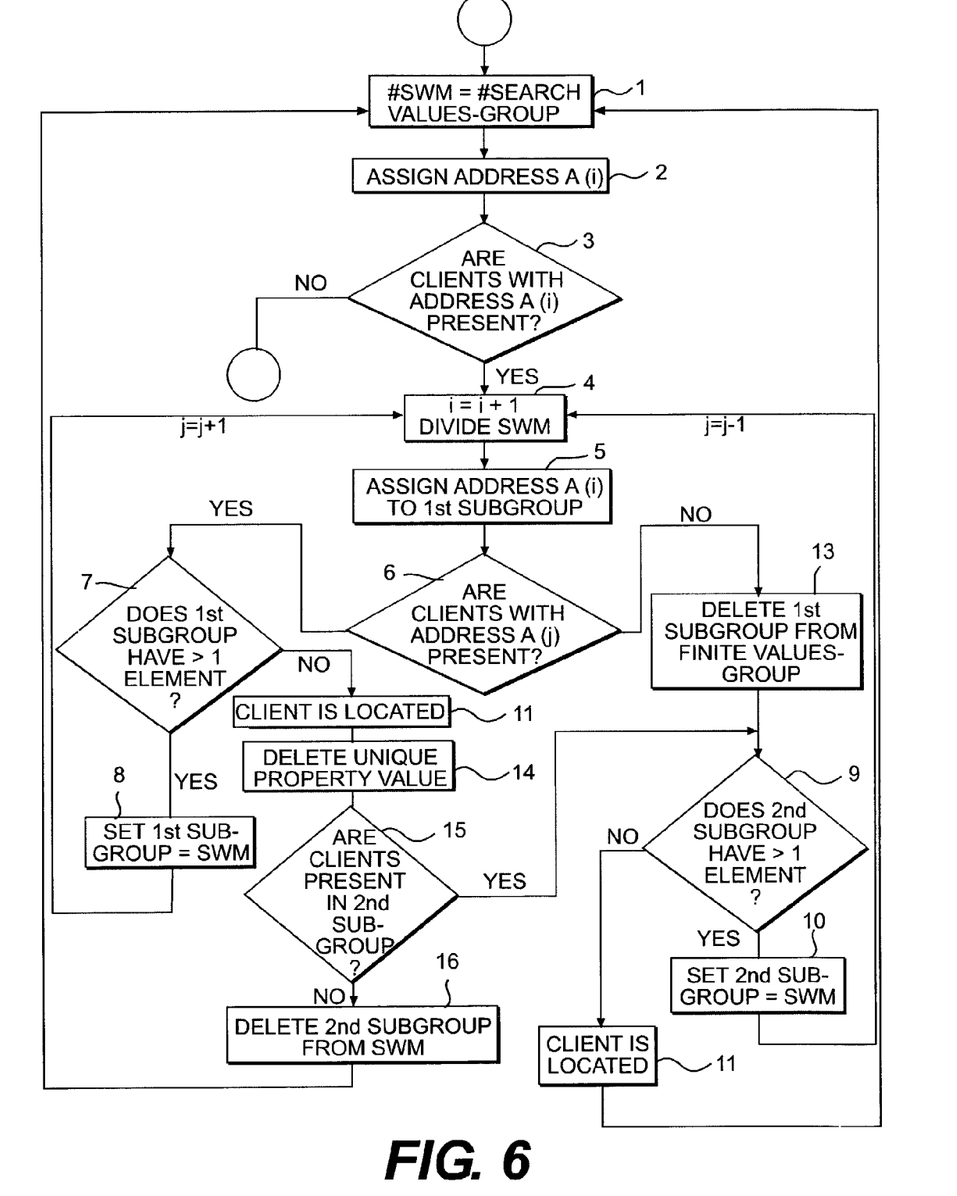
FIG. 6 a flow diagram of a process in which more than two addresses are used simultaneously FIG. 7 an example of the sequence of commands and their effects according to the process of FIG. 6

FIG. 6 shows a flow diagram for a modified process in which more than two different addresses can be used simultaneously in the search values-group. The addresses can be manipulated, e.g., in the form of a vector a (i), $i=0, 1, \ldots$, . Steps 1 to 3 are the same as in the previously described processes, only the designation a for the address is replaced in the figure by a (i).

Figure 7:
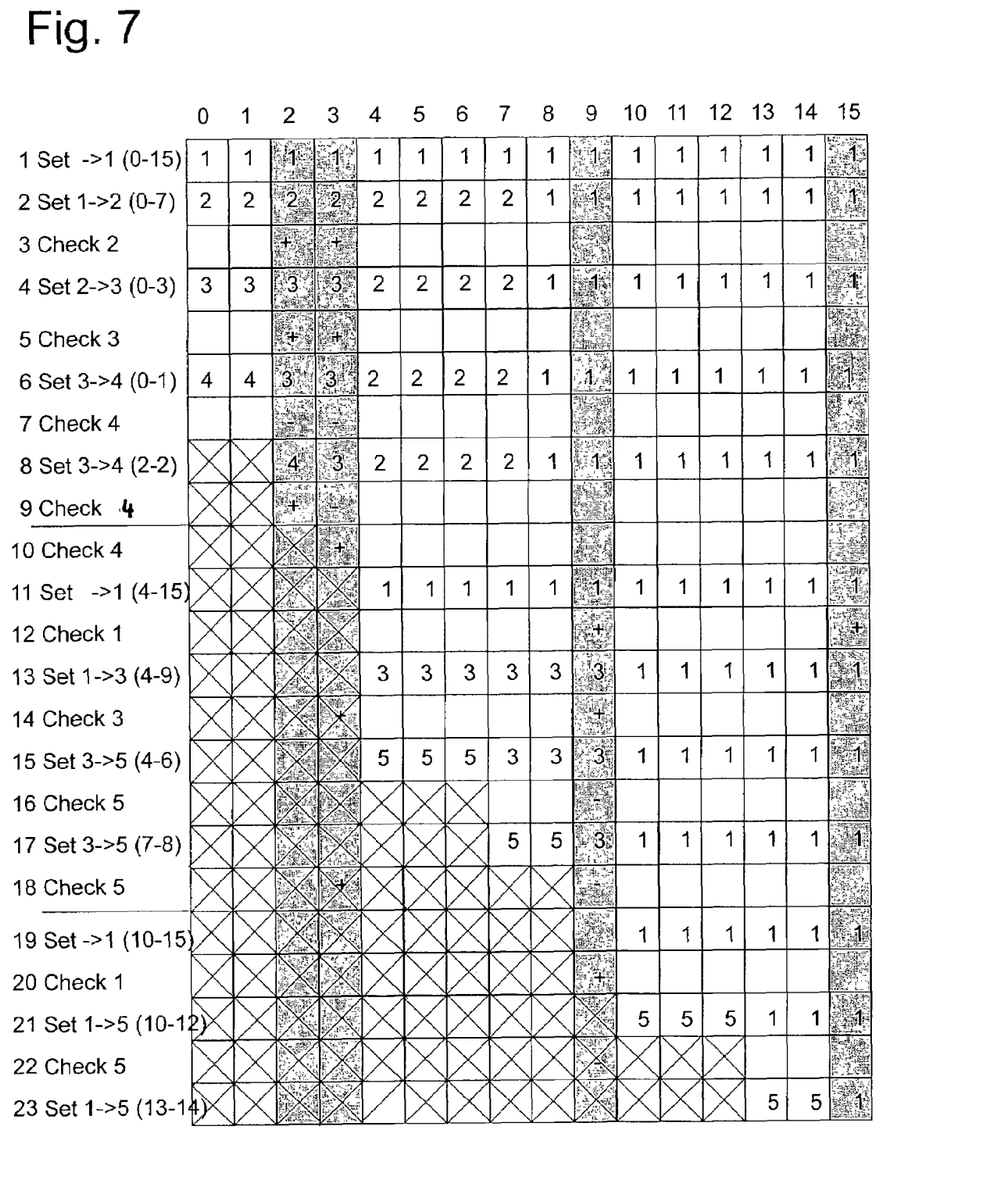

FIG. 7 shows the sequence of commands sent by the server device during implementation of the process shown in FIG. 6.

In FIG. 7 it is assumed that a $(0)=1$. Each repetition of step 4 is accompanied by an incremental increase of 1 in i. Consequently, when step 5 is performed for the first time, as per line 2 in FIG. 7, the address a (1) is assigned, for which address the server device has selected the value 2. The check performed in step 6 (line 3) shows that client devices with address 2 are present, whereupon, the number of elements in the first subgroup are checked in step 7, and as in the previously described exemplary embodiments step 4 is returned to by way of step 8. Here i is set at $i=2$, and in the repetition of step 5 the first subgroup, which now consists of $\{0, 1, 2, 3\}$, is assigned the address a $(2)=3$ (line 4). After another repetition of steps 6, 7, 8, 4, this first subgroup is reduced to the elements $\{0, 1\}$, which now receive the address a $(3)=4$ (line 6). In step 6 (line 7) it is established that no client devices with this address are present, and the process moves on to step 13, in which the elements $\{0, 1\}$ are deleted from the finite values-group.

The second subgroup $\{2, 3\}$ comprises two more elements, so that the following step 9 branches into step 10, where the second subgroup is set as the search values-group, and step 4 is returned to. There i receives the value "4", i.e., the server device again selects the value 4 as address value a (4), since this address value is no longer assigned to any element in the finite values-group and is therefore available; the value is assigned to the first subgroup, consisting of the element "2" (step 5 or line 8).

As can easily be seen from line 9 in FIG. 7, the process then moves from step 6 to step 7 and from there to step 11, where the server device establishes that a client device with the property value "2" is present and has received the address "4".

The property value "2" is deleted from the finite values-group in step 14.

Step 15 then checks whether client devices with the address a $(2)=3$ originally assigned to the second subgroup are present. Since this is indeed the case, the process moves on to step 9 and establishes that the second subgroup contains only the element "3"; it is determined that a client device with the property value "3" is present and has received the address 3; the process then returns to step 1.

If the check performed in step 15 showed that the second subgroup contained no client devices with the given address, the second subgroup would be deleted from the finite values-group in step 16 before the process returned to step 1.

In step 1 the remaining finite values-group $\{4, 5, \ldots, 15\}$ is set as the search values-group. In step 2 an address a (0) is again assigned, which is selected from the still available addresses—address 1, in the case of line 11 of FIG. 7. From here the process repeats itself in a manner analogous to that described above, so that the search for the client devices with property values 9 and 15 does not need to be described in detail; the commands used by the server device in this search are shown in FIG. 7, along with the effects of those commands.

DP systems operating in accordance with the profibus standard are a preferred area of application for the present invention; it is evident, however, that the invention process can be applied to other systems when these are supported by address-assigning commands which permit the transmission of accompanying parameters, on the basis of which a client device receiving this address-assigning command can decide whether it will execute the command or not.

The invention claimed is:

1. A process for assignment of client device addresses to multiple client devices by a server device in a data processing (DP) network, the server device having a processor and a memory, the process comprising the following steps executed by the server device:
   a) setting a finite values-group as a search values-group;
   b) dividing the search values-group into at least two subgroups and assigning addresses to the client devices having a unique property, so that after assigning the addresses, all client devices for which a value of the unique property lies in a first subgroup of said at least two subgroups have a first address (b) and all client devices for which the value of the unique property lies in a second subgroup of said at least two subgroups have a second address (a), and wherein the server device requires data concerning possible values, drawn from the finite values-group, for the client devices while permitting simultaneously addressing all of at least a subset of the client devices;

c) dividing the search values-group and checking whether there exists at least one client device addressed with the first address (b);

d) if so, setting the first subgroup as the search values-group, dividing the search values-group and assigning the second address (a) to the 2nd subgroup, return to step c); and e) if not, setting the second subgroup as the search values-group, dividing the search values-group and assigning the first address (b) to the first subgroup, return to step c), wherein each of the client devices exhibits a unique property, which for each client device has a different value drawn from a finite values-group.

2. A process according to claim 1, wherein the search values-group is divided into exactly two subgroups.

3. A process according to claim 1, wherein when the first subgroup in step d) or the second subgroup in step e) contains one element the client device whose unique property value corresponds to said element is assigned a final address.

4. A process according to claim 1, wherein for each repetition of step c) identical values are used for the first and second address.

5. A process according to claim 1, wherein for each repetition of step d) or e) at least one value which is not assigned to any element of the search values-group is introduced for at least one of the first and second addresses.

6. A process according to claim 5, wherein if in step c) the first subgroup contains one element a check will also be made to determine whether at least one client device exists that can be addressed with the second address and if this is the case and if the second subgroup contains more than one element, then the second subgroup is set as the search values-group and the process returns to step b).

7. A process according to one of the claim 1, wherein if the check in step c) shows that no client device can be addressed with the first address, the elements of the first subgroup are deleted from the finite values-group.

8. A process according to claim 1, wherein one element of the finite values-group for which a client device has been found is deleted from the finite values-group.

9. A server device for a data processing (DP) network, wherein said server device, having a processor and memory, is set up so as to implement the process according to claim 1.

10. A process according to claim 1,
wherein data inputs of the multiple client devices are connected in parallel to the server device, and
wherein the unique property is unrelated to each distance from each client device to the server device.

11. A client device for a data processing (DP) network, whose address in the DP network can be set by an address-assigning command directed to the client device, wherein the client device having a processor and memory is set up so as to compare the value of the property as a unique property with a value range given according to a process of claim 1 in an address-assigning command and to execute or not execute the address-assigning command depending on the result of the comparison.

12. The client device of claim 11, wherein the search values-group is divided into exactly two subgroups.

13. The client device of claim 11, wherein when the first subgroup in step d) or the second subgroup in step e) contains one element the client device whose unique property value corresponds to said element is assigned a final address.

14. The client device of claim 11, wherein for each repetition of step c) identical values are used for the first and second address.

15. The client device of claim 11 wherein for each repetition of step d) or e) at least one value which is not assigned to any element of the search values-group is introduced for at least one of the first and second addresses.

16. The client device of claim 15, wherein if in step c) the first subgroup contains one element a check will also be made to determine whether at least one client device exists that can be addressed with the second address and if this is the case and if the second subgroup contains more than one element, then the second subgroup is set as the search values-group and the process returns to step b).

17. The client device of claim 11, wherein if the check in step c) shows that no client device can be addressed with the first address, the elements of the first subgroup are deleted from the finite values-group.

18. The client device of claim 11, wherein one element of the finite values-group for which a client device has been found is deleted from the finite values-group.

* * * * *